United States Patent
Song et al.

(10) Patent No.: US 8,687,910 B2
(45) Date of Patent: Apr. 1, 2014

(54) IMAGE FILTERING METHOD USING PSEUDO-RANDOM NUMBER FILTER AND APPARATUS THEREOF

(75) Inventors: Hak-Sup Song, Suwon-si (KR); Sun-Mi Park, Suwon-si (KR); Woo-Jin Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 152 days.

(21) Appl. No.: 13/379,088

(22) PCT Filed: Jun. 18, 2010

(86) PCT No.: PCT/KR2010/003952
§ 371 (c)(1),
(2), (4) Date: Dec. 19, 2011

(87) PCT Pub. No.: WO2010/147429
PCT Pub. Date: Dec. 23, 2010

(65) Prior Publication Data
US 2012/0141041 A1    Jun. 7, 2012

Related U.S. Application Data

(60) Provisional application No. 61/218,622, filed on Jun. 19, 2009.

(30) Foreign Application Priority Data

Aug. 19, 2009  (KR) .................. 10-2009-0076736

(51) Int. Cl.
*G06K 9/40*  (2006.01)

(52) U.S. Cl.
USPC ............ 382/260; 382/218; 382/219; 382/220

(58) Field of Classification Search
USPC ......... 382/154, 238, 260, 161, 269, 285, 298, 382/254, 300, 103, 219, 220, 218; 345/582; 348/E5.066, 43, 47; 358/451, 1.2; 375/240.03; 726/22, 23, 2, 27
See application file for complete search history.

(56) References Cited

U.S. PATENT DOCUMENTS 6,314,211 B1 * 11/2001 Kim et al. ............... 382/285
7,406,712 B2 * 7/2008 Kondo ..................... 726/23

(Continued)

FOREIGN PATENT DOCUMENTS

KR   10-2003-005348 A   1/2003
KR   10-2005-0061303 A  6/2005

(Continued)

OTHER PUBLICATIONS

International Search Report [PCT/ISA/210], dated Feb. 15, 2011, from the International Searching Authority, issued in International Application No. PCT/KR2010/003952.

*Primary Examiner* — Anh Do
(74) *Attorney, Agent, or Firm* — Sughrue Mion, PLLC

(57) ABSTRACT

An image filtering method and apparatus that filter a block of a plane area by using a pseudo-random filter are provided, whereby artifacts generated in image encoding and decoding procedures are removed, the method including: determining a similarity between pixel values of a the first block; and generating a second block by selectively applying a pseudo-random filter on the first block according to a result of based on the determining the determined similarity.

21 Claims, 12 Drawing Sheets

(56) References Cited

U.S. PATENT DOCUMENTS

| | | | |
|---|---|---|---|
| 7,634,151 B2* | 12/2009 | Bergman et al. | 382/274 |
| 8,115,804 B2* | 2/2012 | Yang | 348/47 |
| 8,154,585 B2* | 4/2012 | Yang | 348/43 |
| 8,199,817 B2* | 6/2012 | Kim et al. | 375/240.12 |
| 8,199,971 B2* | 6/2012 | Watanabe et al. | 382/103 |

FOREIGN PATENT DOCUMENTS

| | | |
|---|---|---|
| KR | 10-2005-0112445 A | 11/2005 |
| KR | 10-2006-0090979 A | 8/2006 |
| KR | 10-2006-0132813 A | 12/2006 |
| KR | 10-2009-0015459 A | 2/2009 |

* cited by examiner

| $f_0$ | $f_1$ | $f_2$ | $f_3$ |
| --- | --- | --- | --- |
| $f_4$ | $f_5$ | $f_6$ | $f_7$ |
| $f_8$ | $f_9$ | $f_{10}$ | $f_{11}$ |
| $f_{12}$ | $f_{13}$ | $f_{14}$ | $f_{15}$ |

| 0 | 1 | −1 | 0 |
| --- | --- | --- | --- |
| 1 | −1 | 1 | −1 |
| 0 | 0 | −1 | 0 |
| −1 | 1 | 0 | 1 |

| f(0,0) | f(0,1) | f(0,2) | · · · | f(0,13) | f(0,14) | f(0,13) |
|---|---|---|---|---|---|---|
| f(1,0) | | | | | | f(1,15) |
| f(2,0) | | | | | | f(2,15) |

⋮

| f(13,0) | | | | | | f(13,15) |
| f(14,0) | | | | | | f(14,15) |
| f(15,0) | f(15,1) | f(15,2) | · · · | f(15,13) | f(15,14) | f(15,13) |

| f(0,15) | f(1,15) | f(2,15) | · · · | f(13,15) | f(14,15) | f(15,15) | f(0,14)  630  f(15,14)

f(0,13)  f(15,13)

f(0,2)  f(15,2)

f(0,1)  f(15,1)

| f(0,0) | f(1,0) | f(2,0) | · · · | f(13,0) | f(14,0) | f(15,0) |

IMAGE FILTERING METHOD USING PSEUDO-RANDOM NUMBER FILTER AND APPARATUS THEREOF

CROSS-REFERENCE TO RELATED APPLICATIONS

This application is a national phase entry of PCT/KR2010/003952, which was filed on Jun. 18, 2010, and claims the benefit of priority from Korean Patent Application No. 10-2009-0076736, which was filed on Aug. 19, 2009, and U.S. Provisional Application No. 61/218,622 which was filed on Jun. 19, 2009, the disclosures of which are incorporated herein by reference in their entirety.

TECHNICAL FIELD

Apparatuses and methods consistent with exemplary embodiments relate to a method and apparatus for filtering an image, and more particularly, to a method and apparatus for filtering an image by removing artifacts generated in the image during encoding and decoding procedures.

BACKGROUND ART

According to image compression methods including Moving Picture Experts Group-1 (MPEG-1), MPEG-2, MPEG-4 H.264/MPEG-4 Advanced Video Coding (AVD) or the like, in order to encode an image, a picture is divided into image processing units, i.e., macroblocks. Each macroblock is then encoded by using inter-prediction or intra-prediction.

However, when these related art image compression methods are used, blocking artifacts are generated in the decoded image. The image compression methods involve performing a discrete-cosine-transformation and a quantization each sub-block (e.g., a 4×4 block) included in a macroblock. Since the sub-blocks are independently discrete-cosine-transformed and quantized without consideration of adjacent blocks, an image loss occurs in the macroblock, and thus, blocking artifacts that cause noticeable edges between macroblocks are generated in the decoded image. Accordingly, a deblocking filter is used to improve the visual quality of the decoded image by smoothing noticeable edges that occurred in a block-based coding operation.

DESCRIPTION OF THE DRAWINGS

Figure 6A:
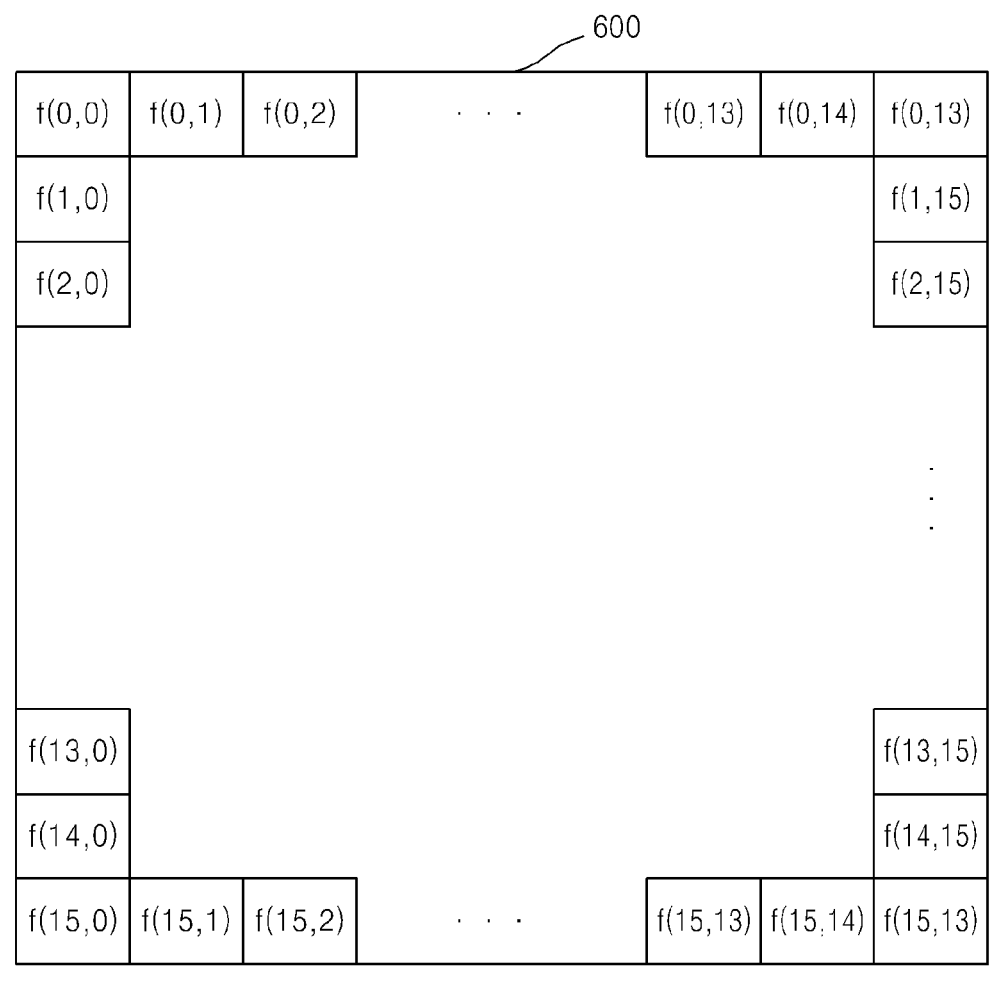
Figure 6B:
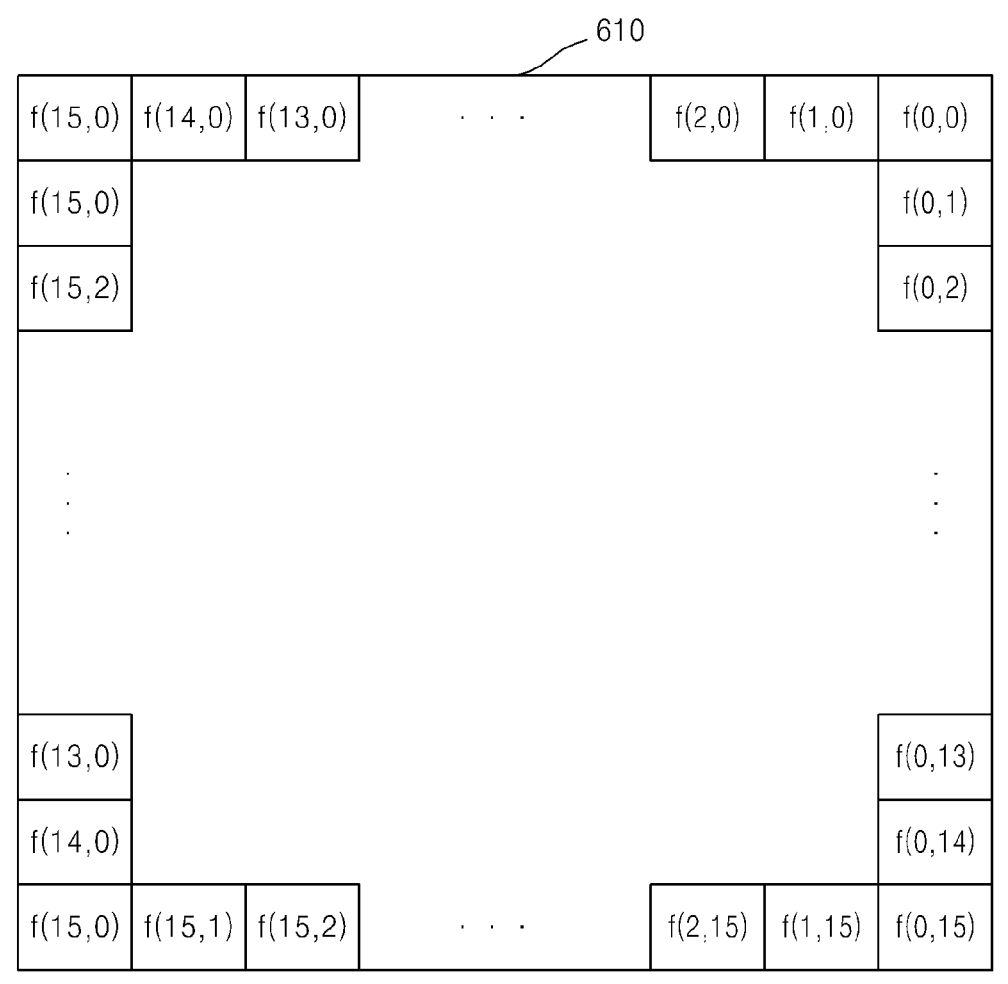

FIGS. 6A through 6D are diagrams of pseudo-random filters according to another exemplary embodiment.

FIG. 7 is a diagram of an image filtering apparatus according to another exemplary embodiment.

SUMMARY

Figure 1:
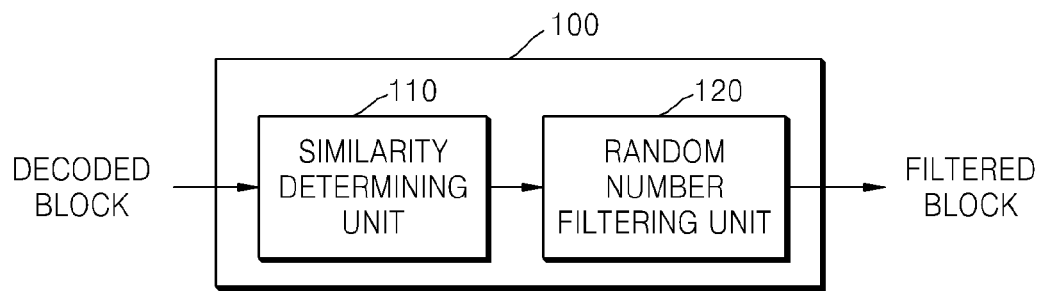
FIG. 1 is a diagram of an image filtering apparatus according to an exemplary embodiment.

One or more exemplary embodiments may overcome the above disadvantages and other disadvantages not described above. However, it is understood that one or more exemplary embodiment are not required to overcome the disadvantages described above, and may not overcome any of the problems described above.

According to an aspect of an exemplary embodiment, there is provided an image filtering method including: determining a similarity between pixel values of a first block; and generating a second block by selectively applying a pseudo-random filter on the first block based on the determined similarity.

The determining of the similarity may include: counting a number of first cases when an absolute value of each of difference values between pixel values that are adjacent to each other in the first block is less than a first threshold value; and determining whether a ratio of the number of first cases to a total number of times of difference value calculations is greater than a second threshold value.

The pixel values may be adjacent to each other in a predetermined direction comprising at least one of a vertical, a horizontal and a diagonal direction.

The image filtering method may further include: generating a third block by sub-sampling the first block, wherein the counting further comprises counting a second number of cases when an absolute value of each of difference values between pixel values that are adjacent to each other in a third block is less than the first threshold value.

The generating of the second block may include applying the pseudo-random filter on the first block if the ratio is greater than the second threshold value, and not applying the pseudo-random filter on the first block if the ratio is equal to or less than the second threshold value.

The determining of the similarity may include determining if the first block is not encoded in a skip mode in which pixel values are not encoded.

The determining of the similarity may include determining if a quantization parameter for encoding of the first block is equal to or greater than a predetermined value.

The determining of the similarity may include determining if an average value of the pixel values of the first block is within a predetermined range.

The generating of the second block may include rotating the pseudo-random filter by 0, 90, 180 or 270 degrees according to a predetermined order.

According to an aspect of an exemplary embodiment, there is provided an image filtering apparatus which receives a first block, the apparatus including: a similarity determining unit which determines a similarity between pixel values of the first block; and a random number filtering unit which generates a second block by selectively applying a pseudo-random filter on the first block based on the determining of the similarity between the pixel values of the first block by the similarity determining unit.

The similarity determining unit may count a first number of cases when an absolute value of each of difference values between pixel values that are adjacent to each other in the first block is less than a first threshold value; and may determine whether a ratio of the number of cases to a total number of times of difference value calculations is greater than a second threshold value.

The pixel values may be adjacent to each other in a predetermined direction including at least one of a vertical, a horizontal and a diagonal direction.

The similarity determining unit may count a second number of cases when an absolute value of each of difference values between pixel values that are adjacent to each other in a third block is less than the first threshold value, wherein the third block may be generated by sub-sampling the first block.

The determining of the similarity by the similarity determining unit may include determining if the ratio is greater than the second threshold value, and not applying the pseudo-random filter on the first block when the ratio is equal to or less than the second threshold value.

The determining of the similarity by the similarity determining unit may include determining if the first block is not encoded in a skip mode in which pixel values are not encoded.

The determining of the similarity by the similarity determining unit may include determining if a quantization parameter for encoding of the first block is equal to or greater than a predetermined value.

The determining of the similarity by the similarity determining unit may include determining if an average value of the pixel values of the first block is within a predetermined range.

The generating of the second block may include rotating the pseudo-random filter by 0, 90, 180 or 270 degrees according to a predetermined order.

A computer readable recording medium having recorded thereon a program for executing an image filtering method including: determining a similarity between pixel values of a first block; and generating a second block by selectively applying a pseudo-random filter on the first block based on the determined similarity.

The selectively applying of the pseudo-random filter on the first block may be performed based on at least one of whether the first block is encoded in a skip mode, whether a quantization parameter is equal to or greater than a predetermined value and whether an average value of the pixel values of the first block is within a predetermined range.

The similarity may be determined by similarity determining unit by calculating a standard deviation of the pixel values included in the first block.

DETAILED DESCRIPTION

Hereinafter, exemplary embodiments will be described in detail by explaining exemplary embodiments with reference to the attached drawings.

FIG. 1 is a diagram of an image filtering apparatus 100 according to an exemplary embodiment.

Referring to FIG. 1, the image filtering apparatus 100 includes a similarity determining unit 110 and a random number filtering unit 120.

The similarity determining unit 110 receives a decoded block and determines in a unit of a block a similarity between pixel values of the decoded block. The decoded block may be a block that is encoded and is then decoded for prediction of another picture or another block, or may be a block that is decoded to display an image in an image decoding procedure. Also, the decoded block may be a block of which blocking artifacts are removed by performing deblocking filtering.

Pixels of a block with respect to a plane area such as a sky line or a sea level have equivalent or similar pixel values. When the block includes pixels of different values, these pixels are visually noticeable. In particular, in many instances, artifacts that did not exist in an original block are generated in image encoding and decoding procedures and then included between the equivalent or similar pixel values. Contour artifacts are an example of such instances.

The image filtering apparatus 100 filters an image so as to remove artifacts generated in image encoding and decoding procedures. In this regard, the similarity determining unit 110 determines a similarity between pixel values included in a first block of a decoded image, and then determines whether the first block indicates a plane area.

FIGS. 2A through 2D are diagrams for describing a method of determining a similarity between pixel values, according to an exemplary embodiment.

The similarity determining unit 110 determines whether pixel values of pixels in a first block 200 are equivalent or similar to each other based on difference values between the pixel values that are adjacent to each other in a predetermined direction in the first block 200.

Figure 2A:
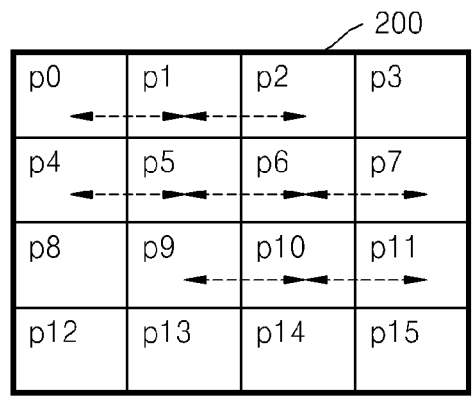
FIGS. 2A through 2D are diagrams for describing a method of determining a similarity, according to an exemplary embodiment.

Referring to FIG. 2A, the similarity determining unit 110 may calculate difference values between pixel values that are adjacent to each other in a horizontal direction in the first block 200. That is, difference values between p0 and p1, p1 and p2, p4 and p5, p5 and p6, p6 and p7, p9 and p10, and p10 and p11 are calculated.

By counting a number of cases when an absolute value of each of the difference values between the pixels that are adjacent to each other in the horizontal direction is less than a first threshold value and when the number of cases is greater than a predetermined number, the similarity determining unit 110 may determine that the pixel values of the first block 200 are equivalent or similar to each other. As used hereinafter, the term "number of cases" refers to a number of cases when an absolute value of each of the difference values between the pixels that are adjacent to each other.

Also, in another example, when a ratio of the number of cases to a total number of times of difference value calculations is greater than a second threshold value, the similarity determining unit 110 may determine that the pixel values of the first block 200 are equivalent or similar to each other.

Referring to FIG. 2A, the total number of times of difference value calculations is 7, and in this regard, when the number of cases when the absolute value of each of the difference values is less then the first threshold value is greater than 3, the similarity determining unit 110 may determine that the pixel values of the first block 200 are equivalent or similar to each other. Also, when the ratio of the number of cases to the total number of times of difference value calculations is greater than 3/7, the similarity determining unit 110 may determine that the pixel values of the first block 200 are equivalent or similar to each other. The first threshold value and the second threshold value may vary according to a characteristic of an image sequence, a characteristic of a current picture, or a characteristic of a block to be filtered.

Figure 2B:
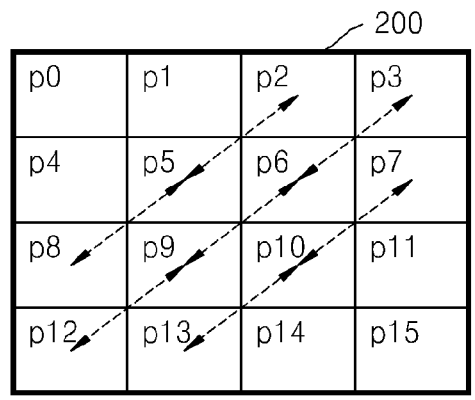
Figure 2C:
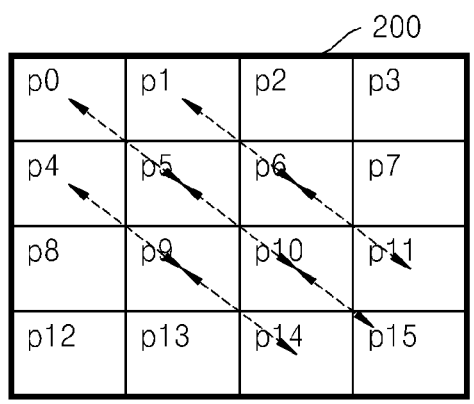
Figure 2D:
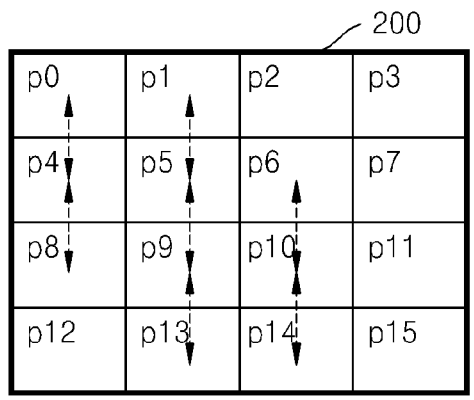

Other than the horizontal direction of FIG. 2A, the similarity determining unit 110 may calculate difference values between pixel values that are adjacent to each other in a diagonal or vertical direction in the first block 200, as illustrated in FIGS. 2B, 2C, and 2D. Also, the similarity determining unit 110 may calculate difference values between pixel values that are adjacent to each other in two or more directions from among vertical, horizontal, and diagonal directions in the first block 200, and may count a number of cases when an absolute value of each of the difference values is less than a first threshold value. When the number of cases is greater than a predetermined number, or when a ratio of the number of cases to a total number of times of difference value calculations is greater than a second threshold value, the similarity determining unit 110 may determine that the pixel values of the first block 200 are equivalent or similar to each other.

The method of determining the similarity based on the difference values between the pixels that are adjacent to each other in the predetermined direction in the first block 200, as illustrated in FIGS. 2A through 2D, is just an example, and thus, the similarity between the pixel values included in the first block 200 may be determined in a different manner. For example, the similarity may be determined by calculating a standard deviation or variation of the pixel values included in the first block 200. By calculating the standard deviation or the variation of the pixel values included in the first block 200, when the standard deviation or the variation is less than a predetermined value, the similarity determining unit 110 may determine that the pixel values included in the first block 200 are equivalent or similar to each other.

Figure 3:
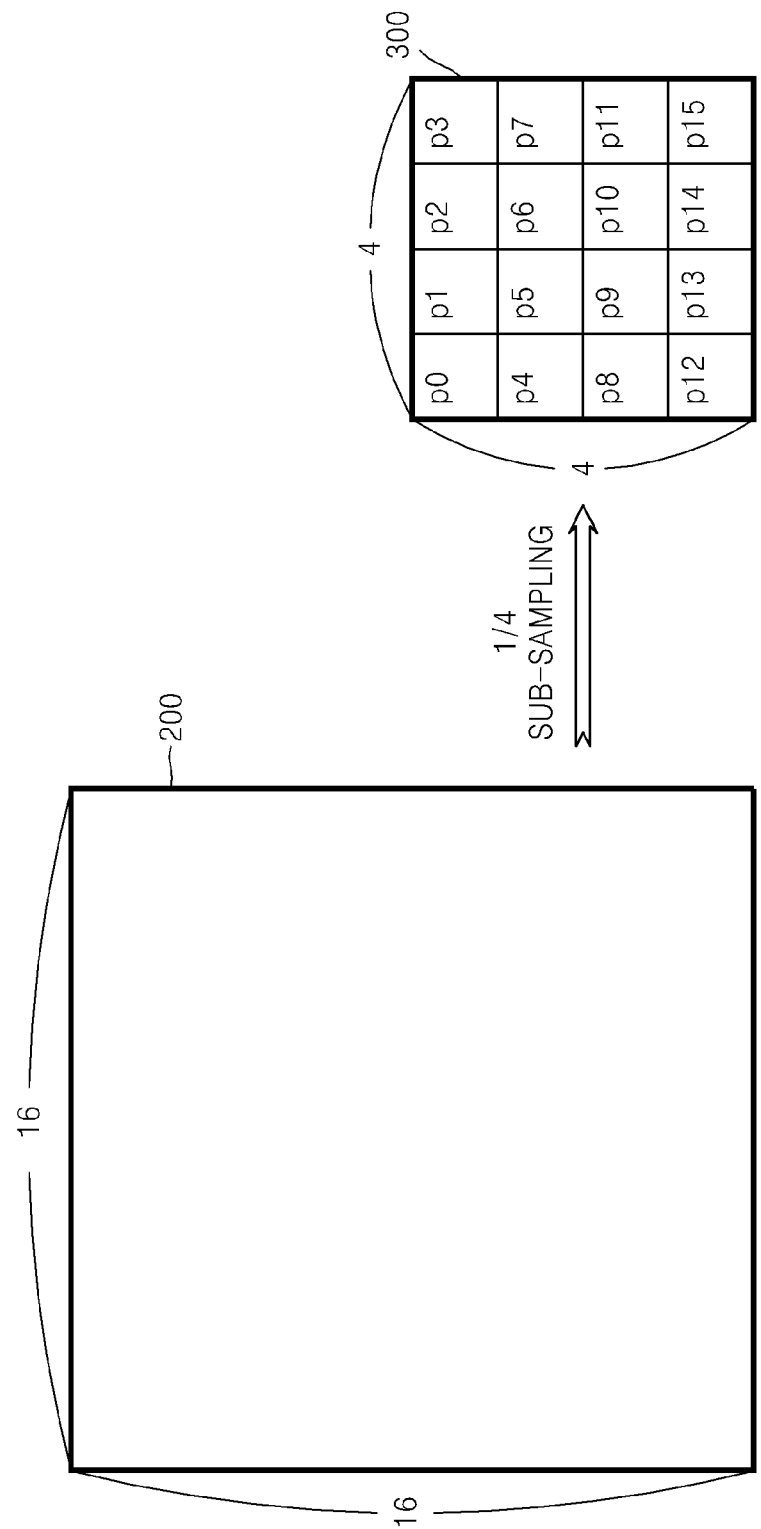
FIG. 3 is a diagram for describing a method of calculating a similarity between pixel values, according to another exemplary embodiment.

FIG. 3 is a diagram for describing a method of calculating a similarity, according to another exemplary embodiment.

FIGS. 2A through 2D are related to the method of determining a similarity between pixel values when a size of the first block 200 is 4×4. However, as illustrated in FIG. 3, when the first block 200 is a large block having a size of 16×16, if difference values are calculated and then a number of cases when an absolute value of each of the difference values is greater than a first threshold value is counted with respect to every block as illustrated in FIGS. 2A through 2D, many calculations are required for similarity determination, and thus, an image filtering speed may deteriorate.

In order to solve this problem, according to the present exemplary embodiment, a third block 300 is generated by performing sub-sampling on the first block 200, and a similarity between pixel values of the third block 300 is determined. As illustrated in FIGS. 2A through 2D, difference values between pixel values that are adjacent to each other in one or more directions from among horizontal, diagonal, and vertical directions in the first block 200 are calculated.

FIG. 3 illustrates an example in which the first block 200 is sub-sampled by a ¼ scale, however, the first block 200 may be sub-sampled by one of various scales. For example, a third block 300 having a size of 8×8 may be generated by sub-sampling the 16×16 block by a ½ scale, and then a similarity between pixel values may be determined.

Referring back to FIG. 1, similarity determination by the similarity determining unit 110 with respect to the pixel values of the first block 200 may be selectively performed only when at least one of predetermined conditions is satisfied.

The similarity determining unit 110 determines the similarity between the pixel values only when the decoded first block 200 is not encoded in a skip mode. The skip mode is an encoding mode in which all of a motion vector and a residual block are not encoded. In a case where the first block 200 is encoded in the skip mode, a prediction motion vector replaces the motion vector of the first block 200, wherein the prediction motion vector is predicted from a motion vector of blocks of a previously encoded or decoded region that is adjacent to the first block 200, and a prediction block that is generated by performing motion compensation according to the prediction motion vector is assumed to be the same as the first block 200 so that the residual block is not encoded.

In an image encoding procedure, if the first block 200 is filtered by using an image filtering method using a pseudo-random filter according to an exemplary embodiment, the first block 200 may be correctly restored in an image decoding procedure only when information is encoded and then included in a bitstream, wherein the information indicates that the first block 200 is filtered by using the pseudo-random filter. However, in a case where the first block 200 is encoded in the skip mode, if the information related to image filtering is additionally encoded, encoding of the first block 200 in the skip mode to increase a compression rate is meaningless. Thus, when the first block 200 is encoded in the skip mode, it is better not to perform the image filtering method using the pseudo-random filter, and thus, it is not necessary to determine the similarity between the pixel values of the first block 200.

In another example, the similarity determining unit 110 determines the similarity between the pixel values only when a quantization parameter of the first block 200 is equal to or greater than a predetermined value. The quantization parameter indicates a parameter with respect to a quantization step of coefficients that are generated by performing an orthogonal transformation on the first block 200 by using a discrete cosine transformation (DCT) or Hadamard transformation. The quantization step is large when the quantization parameter is large, and the quantization step is small when the quantization parameter is small.

Since the quantization parameter is small when the quantization step is small, a pixel value may be further correctly encoded and decoded in image encoding and decoding procedures. Thus, although the image filtering method using the pseudo-random filter is not performed, image deterioration due to artifacts may not occur. Thus, when the quantization parameter that is used in image encoding with respect to the first block 200 is less than the predetermined value, it is better not to perform the image filtering method using the pseudo-random filter, and thus, it is not necessary to determine the similarity between the pixel values of the first block 200.

According to another exemplary embodiment, the similarity determining unit 110 determines a similarity between pixel values of the first block 200 only when an average value of the pixel values is within a predetermined range. This will be described in detail with reference to FIG. 4.

Figures 4, 5A, 5B:
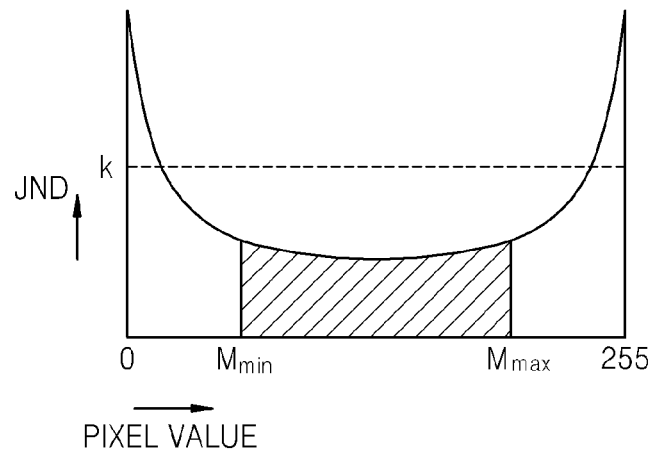
FIG. 4 is a graph for illustrating a range of an average value of a block on which an image filtering method using a pseudo-random filter is performed.
FIGS. 5A and 5B are diagrams of pseudo-random filters according to another exemplary embodiment.

FIG. 4 is a graph for illustrating a range of an average value of a block on which the image filtering method using the pseudo-random filter is performed.

In FIG. 4, a Just Noticeable Difference (JND) with respect to pixel values is illustrated. In a case where a minimum value of the pixel values is 0 and a maximum value of the pixel values is 255, the JND that is recognizable to a viewer varies according to the pixel values. For example, when most of pixel values in the first block 200 are "0", although a pixel with value "k" is included in the first block 200, the viewer may not recognize a difference between the pixel values. However, when most of pixel values in the first block 200 are between Mmin and Mmax, the pixel with value "k" is included in the first block 200, the viewer may easily recognize a difference between the pixel values.

That is, in order to efficiently remove artifacts, it may be necessary to discriminate between blocks according to their sensitivity to a difference between pixel values and then to perform the image filtering method using the pseudo-random filter. In this regard, the image filtering apparatus 100 uses an average value of the pixel values in the first block 200 so as to discriminate a sensitive block from a non-sensitive block. The similarity determining unit 110 determines a similarity of the pixel values in the first block 200 only when the average value is between Mmin and Mmax. With respect to calculation of the average value of the pixel values, the average value of the pixel values in the first block 200 may be directly calculated, or an average value of pixel values in the third block 300 that is generated by sub-sampling the first block 200 may be calculated.

The similarity determining unit 110 may selectively determine a similarity by combining the aforementioned conditions. For example, the similarity determining unit 110 may determine the similarity between the pixel values of the first block 200 only when the first block 200 is not encoded in the skip mode, and the quantization parameter of the first block 200 is equal to or greater than the predetermined value. Also, the similarity determining unit 110 may determine the similarity between the pixel values of the first block 200 only when the first block 200 is not encoded in the skip mode, and the average value of the pixel values is within the predetermined range.

The random number filtering unit 120 generates a second block (not shown) by selectively applying a pseudo-random filter to the first block 200, based on the similarity determination result by the similarity determining unit 110.

When the similarity determining unit 110 determines that the pixel values of the first block 200 are equivalent or similar to each other, the random number filtering unit 120 generates the second block by filtering the first block 200 by applying the pseudo-random filter to the first block 200. As described above, when the number of cases is greater than the predetermined number or when the ratio of the number of cases to the total number of times of difference value calculations is greater than the second threshold value, the similarity determining unit 110 may determine that the pixel values of the first block 200 are equivalent or similar to each other.

FIGS. 5A and 5B are diagrams of pseudo-random filters 500 and 510 according to another exemplary embodiment.

The random number filtering unit 120 performs filtering by masking the first block 200 by using the pseudo-random filter 500 of FIG. 5A. In other words, the random number filtering unit 120 adds filter values f0 through f15 at positions respectively corresponding to pixel values of the first block 200, and then generates a second block (not shown). For example, a pixel value at a position of first column and first row in the second block is p0+f0, and a pixel value at a position of first column and second row in the second block is p1+f1.

The image filtering method is used to remove artifacts that are generated in a block including equivalent or similar pixel values. Thus, the filter values f0 through f15 of FIG. 5A may be set to be used in fine adjustment of the pixel values of the first block 200. FIG. 5B illustrates the pseudo-random filter 510 for finely adjusting the pixel values of the first block 200.

The pseudo-random filter 510 sets the filter values f0 through f15 so as to be one of "−1", "0", or "1", finely adjusts the pixel values according to the set filter values, and then removes an effect when a pixel value different from other pixel values is noticeable in the first block 200 including the pixel values that are equivalent or similar to each other.

FIGS. 6A through 6D are diagrams of pseudo-random filters 600 through 630 according to another exemplary embodiment. In FIGS. 6A through 6D, a size of each of the pseudo-random filters 600 through 630 is 16×16.

When the random number filtering unit 120 filters blocks by using a pseudo-random filter, if the same pseudo-random filter is continuously applied to a plurality of sequential blocks, a pattern of the same pseudo-random filter becomes recognizable to a viewer, such that another artifact is generated. In order to prevent this problem, the random number filtering unit 120 rotates an original pseudo-random filter by a unit of 90 degrees according to a predetermined order, and then uses a plurality of pseudo-random filters obtained by rotating the original pseudo-random filter. For example, if the random number filtering unit 120 uses the pseudo-random filter 600 of FIG. 6A in kth filtering, in k+1th filtering, the random number filtering unit 120 uses the pseudo-random filter 610 of FIG. 6B which is rotated by 90 degree. In k+2th and k+3th filtering, the random number filtering unit 120 uses the pseudo-random filter 620 of FIG. 6C which is rotated by 180 degree, and the pseudo-random filter 630 of FIG. 6D which is rotated by 270 degree.

Figure 6C:
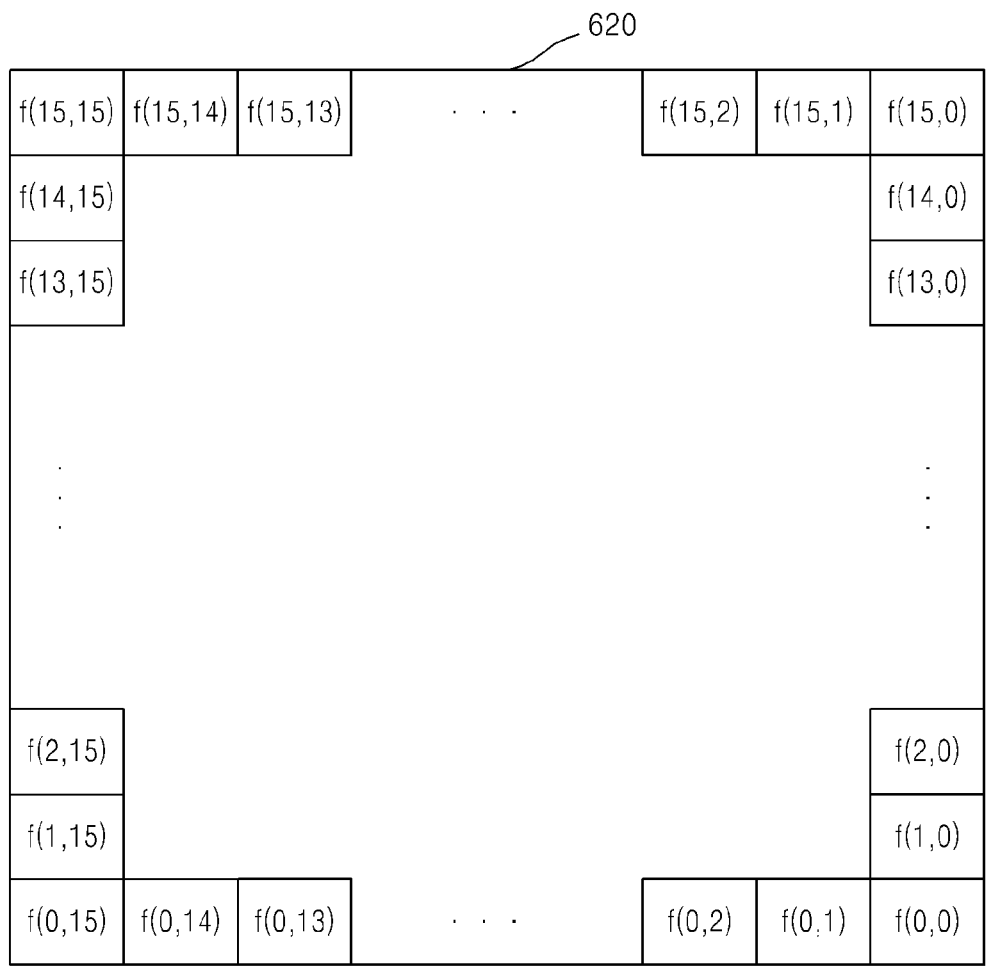
Figures 6D, 7:
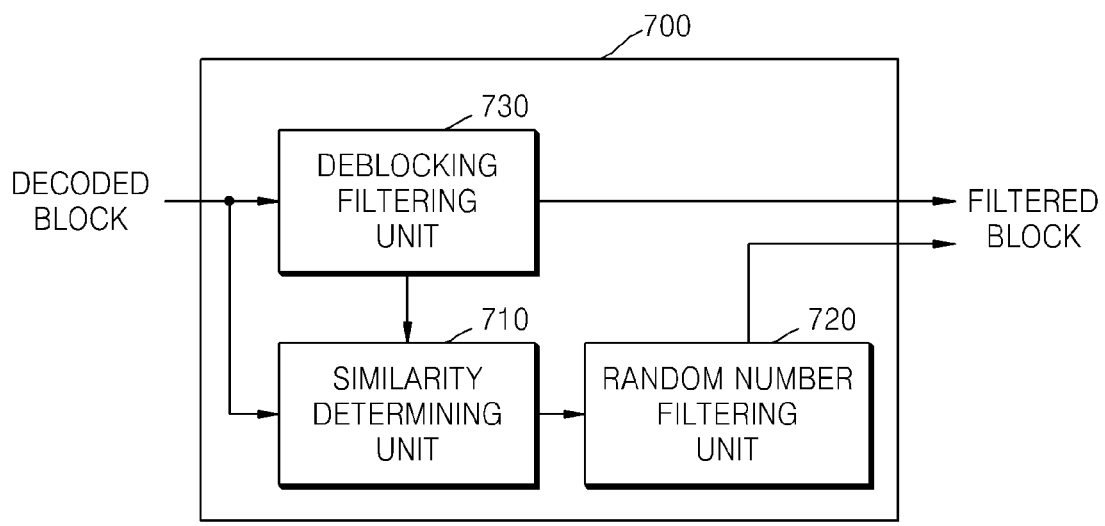

FIG. 7 is a diagram of an image filtering apparatus 700 according to another exemplary embodiment.

Referring to FIG. 7, the image filtering apparatus 700 includes a similarity determining unit 710, a random number filtering unit 720, and a deblocking filtering unit 730. Compared to the image filtering apparatus 100 of FIG. 1, the image filtering apparatus 700 has a difference in the deblocking filtering unit 730 for removing blocking artifacts.

The similarity determining unit 710 corresponds to the similarity determining unit 110 of FIG. 1, and determines a similarity between pixel values of a decoded block. In a similar manner described with reference to FIGS. 2A through 2D, the similarity determining unit 710 determines the similarity by calculating difference values between the pixel values that are adjacent to each other in a predetermined direction.

The random number filtering unit 720 selectively performs filtering by using a pseudo-random filter, based on the decision by the similarity determining unit 710. When the similarity determining unit 710 determines that the pixel values of the decoded block are equivalent or similar to each other, the random number filtering unit 720 generates a second block by applying the pseudo-random filter to the first block 200. The decision of the similarity may be selectively performed according to the aforementioned conditions, that is, according to whether the decoded block is encoded in a skip mode, whether a quantization parameter is equal to or greater than a predetermined value, and whether an average value of the pixel values of the decoded block is within a predetermined range.

The deblocking filtering unit 730 performs deblocking filtering on the decoded block. The deblocking filtering unit 730 performs the deblocking filtering on block boundaries according to a predetermined filtering strength. The deblocking filtering may be performed according to one of conventional block coding techniques including H.264. The deblocking-filtered block may be output without a change according to the similarity decision result by the similarity determining unit 710, or may be output after passing through the similarity determining unit 710 and the random number filtering unit 720 that performs filtering on the deblocking-filtered block by using the pseudo-random filter. Also, in another example, the deblocking filtering, and the filtering by using the pseudo-random filter may be selectively performed. In a case where the pixel values of the decoded block are equivalent or similar to each other according to the similarity decision result by the similarity determining unit 710, the deblocking filtering may not be performed, and only the filtering by using the pseudo-random filter may be performed. In an opposite case, only the deblocking filtering may be performed.

Figure 8:
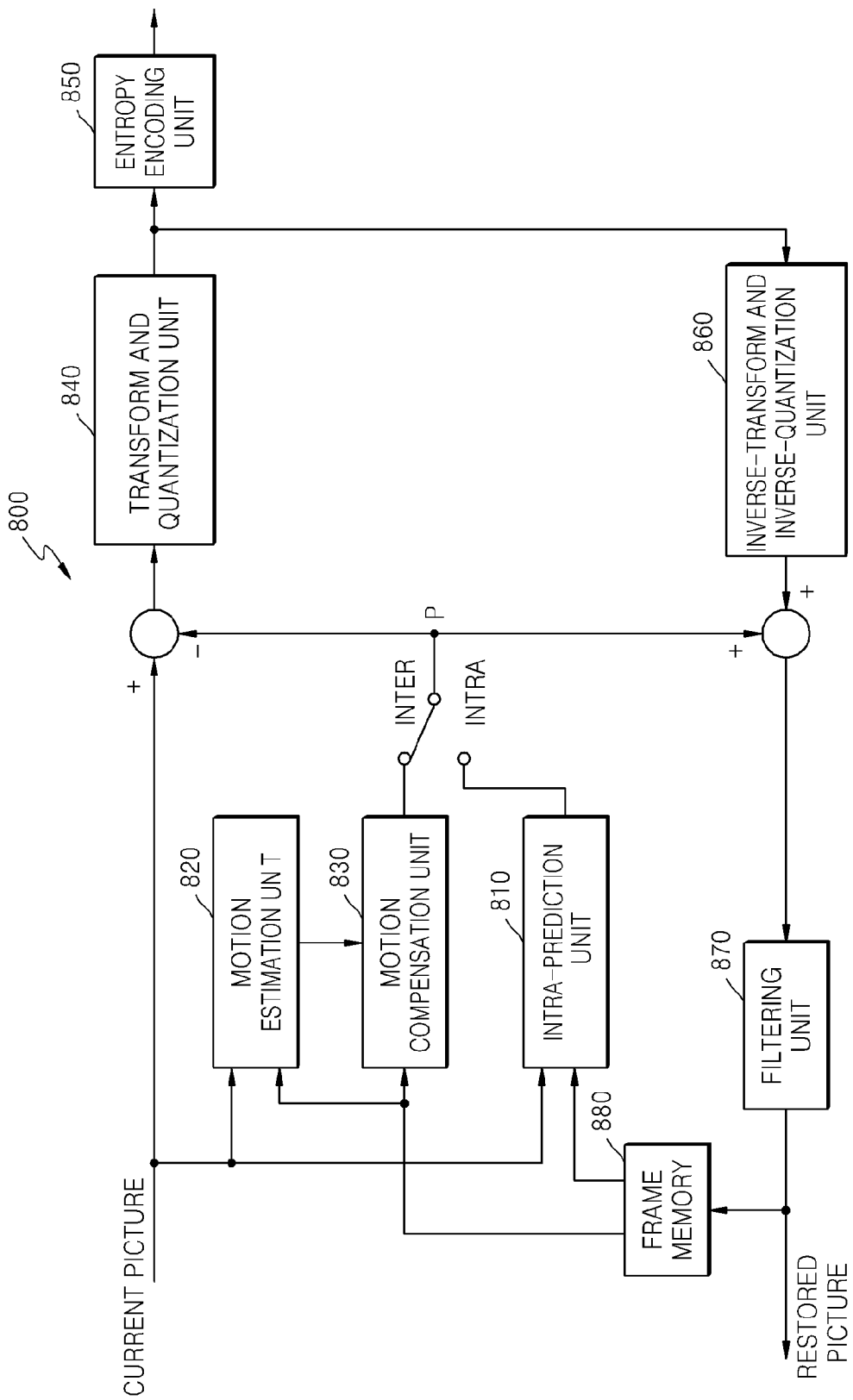
FIG. 8 is a diagram of an image encoding apparatus according to another exemplary embodiment.

FIG. 8 is a diagram of an image encoding apparatus 800 according to another exemplary embodiment.

The image encoding apparatus 800 of FIG. 8 includes one of the image filtering apparatuses 100 and 700.

Referring to FIG. 8, the image encoding apparatus 800 includes an intra-prediction unit 810, a motion estimation unit 820, a motion compensation unit 830, a transformation and quantization unit 840, an entropy encoding unit 850, an inverse-transformation and inverse-quantization unit 860, a filtering unit 870, and a frame memory 880.

The intra-prediction unit 810 predicts a current block by using pixels included in a previously encoded region that is adjacent to the current block. As a result of the prediction, a prediction block is generated.

The motion estimation unit 820 and the motion compensation unit 830 predict the current block based on at least one reference picture stored in the frame memory 880. When the motion estimation unit 820 finds the most similar block to the current block by scanning reference pictures and then generates a motion vector, the motion compensation unit 830 motion-compensates for the current block based on the motion vector.

The transformation and quantization unit 840 performs an orthogonal transformation on a residual block, and quantizes coefficients according to a predetermined quantization parameter, wherein the coefficients are generated by the orthogonal transformation. The orthogonal transformation may be a DCT or Hadamard transformation. The residual block is generated by subtracting the prediction block, which is generated by the intra-prediction unit 810 or the motion compensation unit 830, from the current block.

The entropy encoding unit 850 receives the orthogonal transformation coefficients quantized by the transformation and quantization unit 840, and performs entropy encoding on the orthogonal transformation coefficients. The entropy encoding unit 850 performs the entropy encoding on the orthogonal transformation coefficients by using context-adaptive variable length coding (CAVLC) or context-adaptive variable arithmetic coding (CABAC).

The inverse-transformation and inverse-quantization unit 860 receives the quantized orthogonal transformation coefficients, performs inverse-quantization and inverse-orthogonal transformation on the orthogonal transformation coefficients, and then restores the residual block. The inverse-transformation and inverse-quantization unit 860 restores the current block by adding the restored residual block and the prediction block.

The filtering unit 870 corresponds to one of the image filtering apparatuses 100 and 700. The filtering unit 870 filters the restored current block, i.e., the current block that is encoded and then decoded. The filtering unit 870 performs the filtering by using the pseudo-random filter, which is described above with reference to FIGS. 1 through 7. As described above with reference to FIG. 7, the deblocking filtering is performed on the current block, a similarity between pixel values of the current block is determined, and then the filtering by using the pseudo-random filter may be selectively performed. In addition, only one of the deblocking filtering and the filtering by using the pseudo-random filter may be selectively performed.

Information about the filtering by using the pseudo-random filter is entropy-encoded by the entropy encoding unit 850. Flag information indicating whether the current block is filtered by using the pseudo-random filter may be encoded, and in a case where the filtering is performed by using one of a plurality of pseudo-random filters, information for specifying the one of the plurality of pseudo-random filters may also be encoded. Without using the plurality of pseudo-random filters, if one pseudo-random filter is used in filtering while the pseudo-random filter is rotated by a unit of 90 degrees according to a predetermined order as described with reference to FIGS. 6A through 6D, the amount of information to be encoded may be decreased while the same effect as that of using the plurality of pseudo-random filters is obtained. The filtered current block is stored in the frame memory 880, and is used in prediction of another picture or another block.

Figure 9:
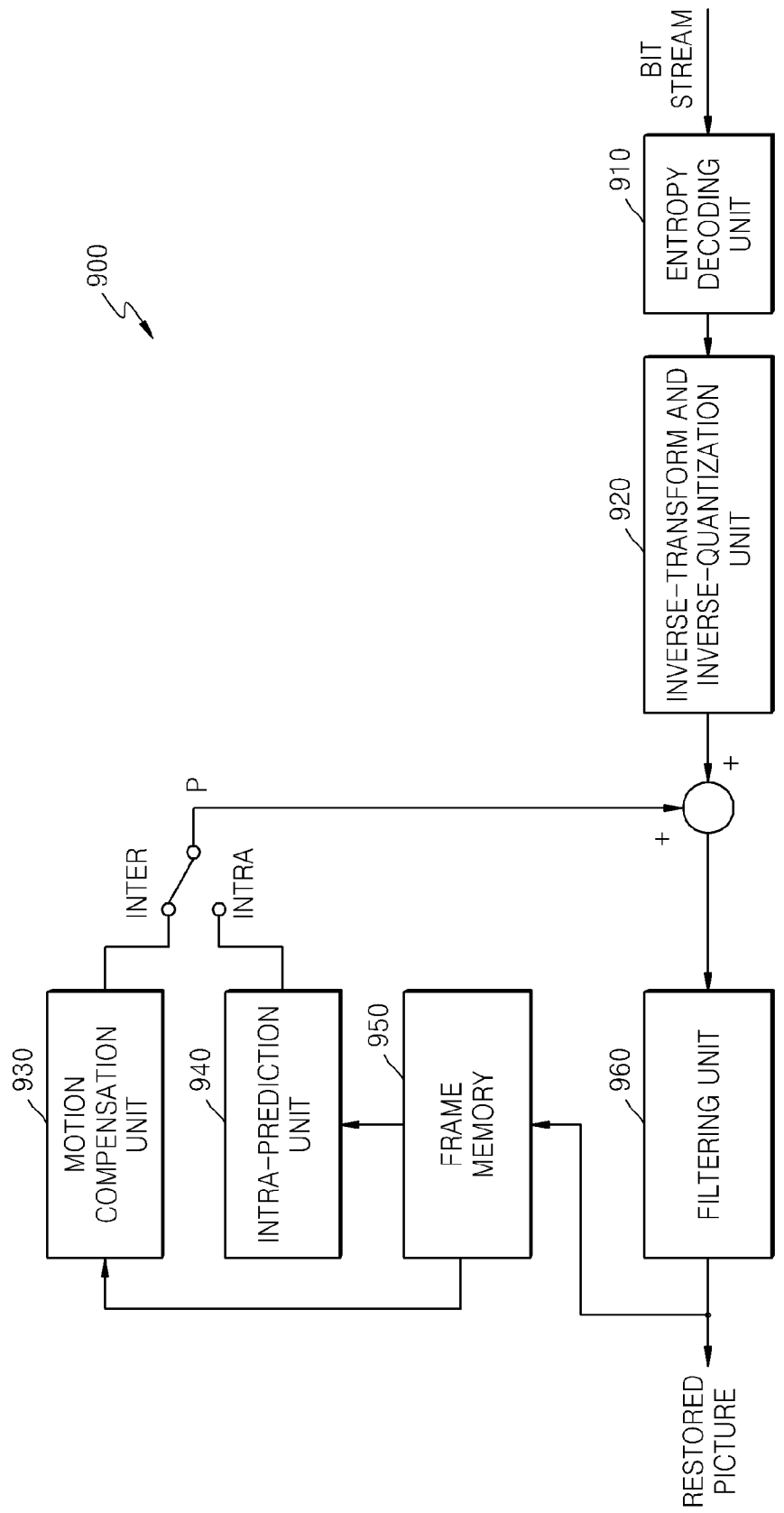
FIG. 9 is a diagram of an image decoding apparatus according to another exemplary embodiment.

FIG. 9 is a diagram of an image decoding apparatus 900 according to another exemplary embodiment.

The image decoding apparatus 900 of FIG. 9 includes one of the image filtering apparatuses 100 and 700.

Referring to FIG. 9, the image decoding apparatus 900 includes an entropy decoding unit 910, an inverse-transformation and inverse-quantization unit 920, a motion compensation unit 930, an intra-prediction unit 940, a frame memory 950, and a filtering unit 960.

The entropy decoding unit 910 receives a bitstream, performs entropy-decoding on the received bitstream, and then extracts data regarding a current block. The data regarding the current block may include data regarding quantized orthogonal transformation coefficients with respect to the current block, and information regarding filtering by using a pseudo-random filter.

The inverse-transformation and inverse-quantization unit 920 performs inverse-orthogonal transformation and inverse-quantization based on the data regarding quantized orthogonal transformation coefficients, which is extracted by the entropy decoding unit 910, and then restores a residual block of the current block.

The motion compensation unit 930 scans at least one reference picture stored in the frame memory 950, based on a motion vector of the current block, and then inter-predicts the current block.

The intra-prediction unit 940 inter-predicts the current block by using pixels included in a previously decoded region that is adjacent to the current block.

By adding a prediction block, which is generated by the motion compensation unit 930 or the intra-prediction unit 940, and the residual block that is restored by the inverse-transformation and inverse-quantization unit 920, the current block is restored.

The filtering unit 960 corresponds to one of the image filtering apparatuses 100 and 700. The filtering unit 960 filters the restored current block, i.e., the decoded current block. The filtering unit 960 may perform the filtering by using the pseudo-random filter, which has been described above with reference to FIGS. 1 through 7. As described above with reference to FIG. 7, the deblocking filtering is performed on the current block, a similarity between pixel values of the current block is determined, and then the filtering by using the pseudo-random filter may be selectively performed. In addition, only one of the deblocking filtering and the filtering by using the pseudo-random filter may be selectively performed. The filtered current block is stored in the frame memory 950, and is used in prediction of another picture or another block.

Figure 10:
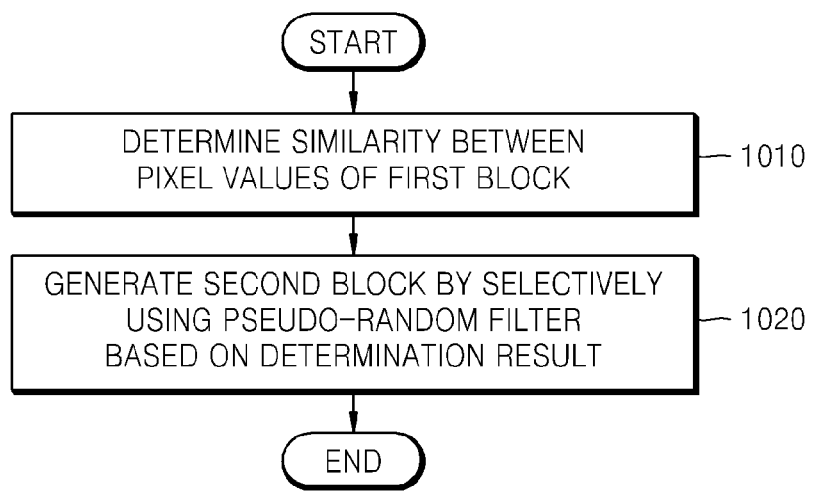
FIG. 10 is a flowchart of an image filtering method, according to another exemplary embodiment.

FIG. 10 is a flowchart of an image filtering method, according to another exemplary embodiment.

Referring to FIG. 10, in operation 1010, the image filtering apparatus 100 or 700 according to the one or more exemplary embodiments (hereinafter, referred to as "the image filtering apparatus") determines a similarity between pixel values of a first block. The image filtering apparatus determines whether the pixel values of the first block are equivalent or similar to each other. As illustrated in FIGS. 2A through 2D, by counting a number of cases when an absolute value of each of difference values between the pixel values that are adjacent to each other in a predetermined direction is less than a first threshold value when the number of cases is greater than a predetermined number, or when a ratio of the number of cases to a total number of times of difference value calculations is greater than a second threshold value, the image filtering apparatus may determine that the pixel values of the first block are equivalent or similar to each other.

In operation 1020, the image filtering apparatus generates a second block by selectively performing filtering by using a pseudo-random filter based on the determination result on the similarity between the pixel values of the first block which is obtained in operation 1010. In operation 1010, when it is determined that the pixel values of the first block are equivalent or similar to each other, the second block is generated by using the pseudo-random filter, and when it is determined that the pixel values of the first block are not equivalent or similar to each other, the pseudo-random filter is not used.

Figure 11:
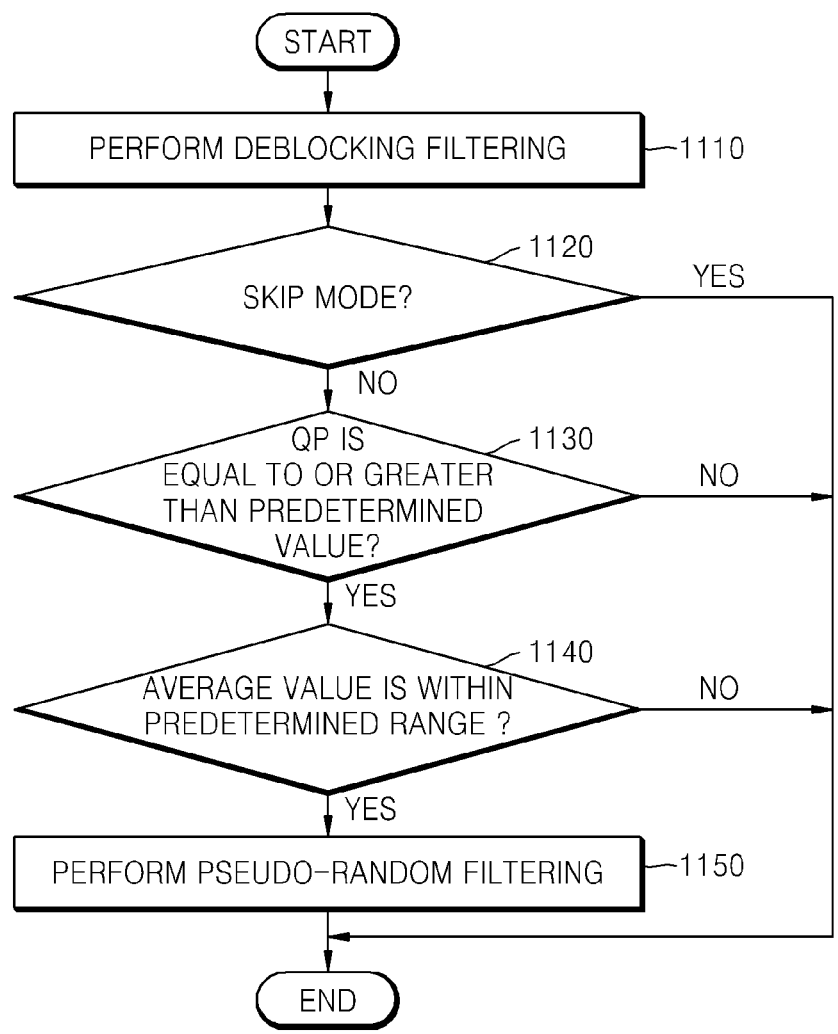
FIG. 11 is a flowchart of an image filtering method, according to another exemplary embodiment.

FIG. 11 is a flowchart of an image filtering method, according to another exemplary embodiment.

Referring to FIG. 11, in operation 1110, the image filtering apparatus performs deblocking filtering on a first block. The image filtering apparatus may perform the deblocking filtering on the first block by using one of conventional block coding techniques including H.264.

Operations 1120 through 1140 are performed so as to selectively determine a similarity between pixel values of the first block according to at least one of predetermined conditions.

Referring to FIGS. 1120 through 1140, filtering is performed by applying a pseudo-random filter on the first block only when the first block is not encoded in a skip mode, a quantization parameter of the first block is equal to or greater than a predetermined value, and an average value of the pixel values of the first block is within a predetermined range. FIG. 11 illustrates an example in which the pseudo-random filter is used only when the aforementioned three conditions are all satisfied, however, it is obvious to one of ordinary skill in the art that the pseudo-random filter may be selectively used when at least one of the aforementioned three conditions is satisfied.

Operation 1150 corresponds to operations 1010 and 1020 of the image filtering method of FIG. 10. When the first block satisfies conditions of operations 1120 through 1140, the image filtering apparatus determines the similarity between the pixel values of the first block, and filters the first block by selectively applying the pseudo-random filter on the first block according to the determination result. As a result of the filtering, a second block is generated.

According to the one or more exemplary embodiments, a block including equivalent or similar pixel values is filtered by using the pseudo-random filter so that the artifacts generated in the image encoding and decoding procedures may be further efficiently removed.

Another exemplary embodiment may include a computer-readable medium. The computer-readable recording medium is any data storage device that can store data, which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion.

For example, each of the image filtering apparatuses of FIGS. 1 and 7, and each of the image encoding and decoding apparatuses of FIGS. 8 and 9 may include a bus coupled to each apparatus and at least one processor coupled to the bus. Also, each of the image filtering apparatuses and each of the image encoding and decoding apparatuses according to the one or more exemplary embodiments may include a memory coupled to the at least one processor that is coupled to the bus so as to store commands, received messages, or generated messages, and to execute the commands.

While exemplary embodiments have been particularly shown and described with reference to exemplary embodiments thereof, it will be understood by those of ordinary skill in the art that various changes in form and details may be made therein without departing from the spirit and scope as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

The invention claimed is:

1. An image filtering method which is executable by using an image filtering apparatus which includes a similarity determining unit and a random number filtering unit, the method comprising:
   determining, by the similarity determining unit, a similarity between pixel values of a first block; and
   generating, by the random number filtering unit, a second block by selectively applying a pseudo-random filter on the first block based on the determined similarity.

2. The image filtering method of claim 1, wherein the determining of the similarity comprises:
   counting a number of first cases when an absolute value of each of difference values between pixel values that are adjacent to each other in the first block is less than a first threshold value; and
   determining whether a ratio of the number of first cases to a total number of times of difference value calculations is greater than a second threshold value.

3. The image filtering method of claim 2, wherein the pixel values are adjacent to each other in a predetermined direction comprising at least one of a vertical, a horizontal and a diagonal direction.

4. The image filtering method of claim 2, further comprising:
   generating a third block by sub-sampling the first block,
   wherein the counting further comprises counting a second number of cases when an absolute value of each of difference values between pixel values that are adjacent to each other in a third block is less than the first threshold value.

5. The image filtering method of claim 2, wherein the generating of the second block comprises applying the pseudo-random filter on the first block if the ratio is greater than the second threshold value, and not applying the pseudo-random filter on the first block if the ratio is equal to or less than the second threshold value.

6. The image filtering method of claim 1, wherein the determining of the similarity comprises determining if the first block is not encoded in a skip mode in which pixel values are not encoded.

7. The image filtering method of claim 1, wherein the determining of the similarity comprises determining if a quantization parameter for encoding of the first block is equal to or greater than a predetermined value.

8. The image filtering method of claim 1, wherein the determining of the similarity comprises determining if an average value of the pixel values of the first block is within a predetermined range.

9. The image filtering method of claim 1, wherein the generating of the second block comprises rotating the pseudo-random filter by 0, 90, 180 or 270 degrees according to a predetermined order.

10. An image filtering apparatus which receives a first block, the apparatus comprising:

a similarity determining unit which determines a similarity between pixel values of the first block; and a random number filtering unit which generates a second block by selectively applying a pseudo-random filter on the first block based on the determining of the similarity between the pixel values of the first block by the similarity determining unit.

11. The image filtering apparatus of claim 10, wherein the similarity determining unit counts a first number of cases when an absolute value of each of difference values between pixel values that are adjacent to each other in the first block is less than a first threshold value; and determines whether a ratio of the number of cases to a total number of times of difference value calculations is greater than a second threshold value.

12. The image filtering apparatus of claim 11, wherein the pixel values are adjacent to each other in a predetermined direction comprising at least one of a vertical, a horizontal and a diagonal direction.

13. The image filtering apparatus of claim 11, wherein the similarity determining unit counts a second number of cases when an absolute value of each of difference values between pixel values that are adjacent to each other in a third block is less than the first threshold value, wherein the third block is generated by sub-sampling the first block.

14. The image filtering apparatus of claim 11, wherein the determining of the similarity by the similarity determining unit comprises determining if the ratio is greater than the second threshold value, and does not apply the pseudo-random filter on the first block when the ratio is equal to or less than the second threshold value.

15. The image filtering apparatus of claim 10, wherein the determining of the similarity by the similarity determining unit comprises determining if the first block is not encoded in a skip mode in which pixel values are not encoded.

16. The image filtering apparatus of claim 10, wherein the determining of the similarity by the similarity determining unit comprises determining if a quantization parameter for encoding of the first block is equal to or greater than a predetermined value.

17. The image filtering apparatus of claim 10, wherein the determining of the similarity by the similarity determining unit comprises determining if an average value of the pixel values of the first block is within a predetermined range.

18. The image filtering apparatus of claim 10, wherein the generating of the second block comprises rotating the pseudo-random filter by 0, 90, 180 or 270 degrees according to a predetermined order.

19. A non-transitory computer readable recording medium having recorded thereon a program for executing the image filtering method of claim 1.

20. The image filtering apparatus of claim 10, wherein the selectively applying of the pseudo-random filter by the random number filtering unit on the first block is performed based on at least one of whether the first block is encoded in a skip mode, whether a quantization parameter is equal to or greater than a predetermined value and whether an average value of the pixel values of the first block is within a predetermined range.

21. The image filtering apparatus of claim 10, wherein the similarity is determined by similarity determining unit by calculating a standard deviation of the pixel values included in the first block.

* * * * *